UNITED STATES PATENT OFFICE.

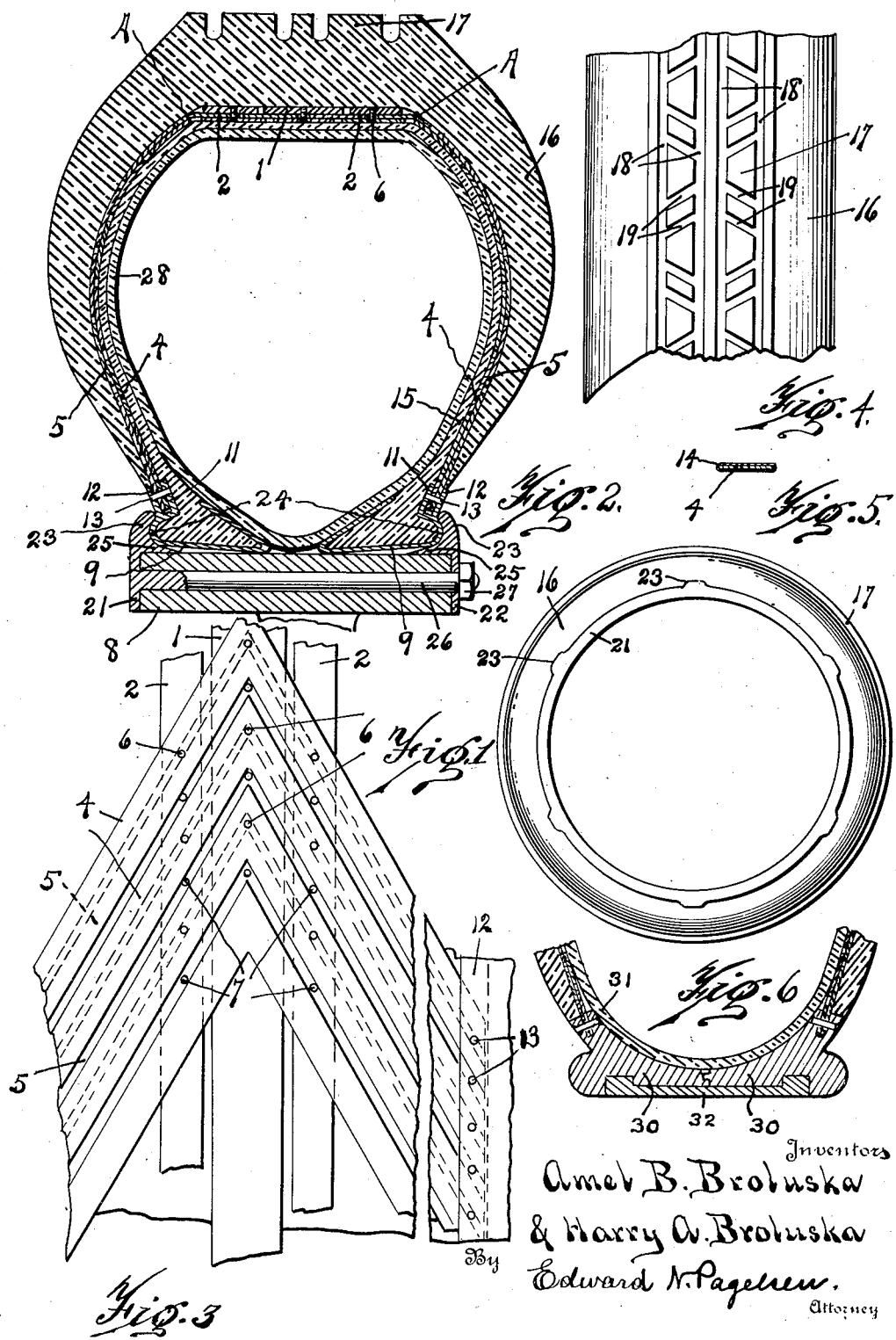

AMEL B. BROLUSKA AND HARRY A. BROLUSKA, OF DETROIT, MICHIGAN, ASSIGNORS OF ONE-THIRD TO CYRIL CAILLIAU, OF DETROIT, MICHIGAN.

VEHICLE-TIRE.

1,384,551.  Specification of Letters Patent.  Patented July 12, 1921.

Application filed April 2, 1920. Serial No. 370,760.

*To all whom it may concern:*

Be it known that we, AMEL B. BROLUSKA and HARRY A. BROLUSKA, citizens of the United States, and residing at Detroit, county of Wayne, and State of Michigan, have invented a new and Improved Vehicle-Tire, of which the following is a specification.

This invention relates to the construction of pneumatic vehicle tires, and its object is to provide a puncture proof tire having great resiliency and which may be worn down thin without danger of blow-outs.

This invention consists generally of a rubber tire reinforced by means of circumferential bands in the tread portion near its inner surface and V-shaped plates secured to the bands and extending diagonally around the tires, and metal rings constituting the inner edges of the tire to which rings the inner ends of the plates are pivotally connected.

It further consists in using two series of said plates, one within the other, the two series breaking joints, and the rivets used to secure the inner series to the bands passing between the plates of the outer series.

It also consists in the details of construction illustrated in the accompanying drawing and particularly pointed out in the claims.

In the drawing, Figure 1 is a side elevation of a tire embodying our invention. Fig. 2 is a cross section of the same. Fig. 3 is an inner elevation of the metal reinforcement of the tire casing. Fig. 4 is a plan of a short section of this improved tire casing. Fig. 5 is a cross section of the metal casing reinforcement. Fig. 6 is a portion of cross section of a modified form of tire.

Similar reference characters refer to like parts throughout the several views.

The two great dangers to which tires are subjected are blow-outs when the casing becomes worn, and punctures. We have guarded against both of these dangers by providing a metal reinforcement in the form of endless circumferential bands, V-shaped diagonal plates, and anchor rings for the diagonal plates. The principal reason for the circumferential bands is to provide means for holding the central portions of the V-shaped plates properly spaced and united.

The endless circumferential bands 1 and 2 are of any desired width and are preferably of the same diameter so that they constitute a cylindrical body of considerable width. Two series of V-shaped plates 4 and 5 are secured to these bands by means of the rivets 6 and 7, the plates of the two series overlapping as shown in Fig. 3, and the rivets which secure the plates of the inner series passing between the plates of the outer series, and vice versa. The central points of these plates will preferably extend in the direction that the wheel is rolling, that is, these points will first receive the impact of the roadway.

The plates are flat up to about the points A where they bend and extend diagonally inwardly toward the felly 8. Their inner ends connect to the metal rings 9, being secured to the flanges 11 and 12 by means of rivets 13 which permit these plates to swing slightly relative to these rings. These V-shaped plates and the bands 1 and 2 are preferably covered with tape 14, as indicated in Fig. 5, before they are embedded in the rubber.

The casing is provided with an inner skin 15 of rubber which preferably extends into the hollow rings 9 and fills the space therein, while an outer layer 16 of rubber extends around the reinforcement between the flanges 12. The tread portion 17 is preferably substantially cylindrical with four circumferential grooves 18 connected by transverse grooves 19, to give a good non-skid effect.

This tire is intended for use without the usual auxiliary rims, the tire being slipped directly onto the felly 8. This felly has a permanent locking ring 21 on one side, and a removable ring 22 on the other, each provided with a series of spaced hooks 23 to engage the beads 24 on the rings 9 and wedges 25 to center the tire. The rings 21 and 22 are held in position by the bolts 26 and nuts 27. The usual inner tube 28 will be used.

In the modification shown in Fig. 6, the rings 30 at the inner edges of the casing are preferably of rolled steel formed with a tongue and groove connection to insure a smooth seat for the inner tube 31. At intervals, transverse grooves are formed in the inner face of these rings to receive the ties 32 which hold the rings together.

The tire shown in Fig. 2 cannot be carried inflated to working pressure unless mounted on a wheel, but the tire indicated in Fig. 6 may be carried properly pumped up separate and apart from a wheel. The remaining parts of this tire may be the same as that shown in Fig. 1.

The proportions and sizes of the details of this tire construction may all be changed by those skilled in the art without departing from the spirit of our invention as set forth in the following claims.

The bands 1 and 2, the plates 4 and 5 and the rings 9 and 30 may be made of any suitable material and covered by any proper protective coating. Any proper resilient substance may be employed in place of the rubber for the construction of the treads and the lining of the tire casings.

What we claim and desire to secure by Letters Patent is:

1. In a vehicle tire, the combination of circumferential bands and narrow plates secured to said bands, the ends of the plates extending diagonally around the tire.

2. In a vehicle tire, the combination with circumferential bands and two series of V-shaped plates secured thereto, the plates of one series overlapping the joints of the other series, and rubber within and without the band and plates.

3. In a vehicle tire, the combination with circumferential bands and two series of V-shaped plates secured thereto, the plates of one series overlapping the joints of the other series, and rubber within and without the band and plates, the points of all the plates extending in the same direction.

4. In a vehicle tire, the combination with circumferential bands and curved plates secured to said bands intermediate the ends of the plates, the ends of said plates extending diagonally from said bands.

5. In a vehicle tire, the combination with circumferential bands and V-shaped plates secured thereto, hollow metal rings to which the ends of the plates are pivotally connected, a rubber tread outside of the bands and having edge portions extending to said rings, and a rubber lining extending around within said plates and into the hollow rings.

6. In a vehicle tire, the combination with circumferential bands and V-shaped plates secured thereto, hollow metal rings to which the ends of the plates are pivotally connected, a rubber tread outside of the bands and having edge portions extending to said rings, a rubber lining extending around within said plates and into the hollow rings, a felly, and rings on each side of the felly to position the tire and formed with hooks to engage the rings on the tire to secure the tire to the felly and with wedges to engage between the felly and the rings to position the tire on the felly.

7. In a vehicle tire, the combination with circumferential bands and V-shaped plates secured thereto, metal rings to which the ends of the plates are pivotally connected, and a layer of rubber on the outside of the bands and plates.

8. In a vehicle tire, the combination with circumferential bands and V-shaped plates secured thereto, a resilient tread on the outside of the bands and plates, and means separating the bands and plates from the rubber and from each other.

9. In a vehicle tire, the combination with circumferential bands and V-shaped plates secured thereto, and a rubber tread on the outside of the bands and plates, said plates extending around near the inner side of the tire and diagonally thereof.

10. In a vehicle tire, the combination with circumferential bands and two series of V-shaped plates secured thereto, the plates of one series overlapping the joints of the other series, and rubber within and without the band and plates, each of said plates being secured to said bands independently of every other plate.

11. In a vehicle tire, the combination with circumferential bands and V-shaped plates secured thereto, rings to which the ends of the plates are pivotally connected, and a layer of rubber on the outside of the bands and plates, each of said plates being connected to said rings independently of every other plate.

AMEL B. BROLUSKA.
HARRY A. BROLUSKA.